United States Patent
Augustin

(10) Patent No.: US 6,568,876 B2
(45) Date of Patent: May 27, 2003

(54) DRILLING DEVICE

(75) Inventor: Michael Augustin, Ludesch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/942,381

(22) Filed: Aug. 29, 2001

(65) Prior Publication Data

US 2002/0028105 A1 Mar. 7, 2002

(30) Foreign Application Priority Data

Sep. 4, 2000 (DE) .......................... 100 43 429

(51) Int. Cl.[7] ................................. F16B 2/18
(52) U.S. Cl. ....................... 403/374.5; 403/322.4; 408/238; 248/669
(58) Field of Search .................. 403/322.4, 325, 403/314, 321, 338, 363, 374.5, 374.1, 374.2, 385; 248/669; 211/69; 408/240, 238, 197, 198

(56) References Cited

U.S. PATENT DOCUMENTS

| 3,464,655 A | * | 9/1969 | Schuman | ..................... 248/651 |
| 4,500,235 A | * | 2/1985 | Johnsen | ..................... 408/238 |
| 4,540,149 A | * | 9/1985 | Rupprecht et al. | ........... 248/669 |
| 4,779,856 A | * | 10/1988 | Beeler | .......................... 269/45 |
| 5,302,045 A | * | 4/1994 | Johnsen | ....................... 403/322 |
| 6,039,038 A | * | 3/2000 | Buck et al. | .................... 125/39 |
| 6,155,154 A | * | 12/2000 | Hsu | ......................... 403/322.4 |

* cited by examiner

Primary Examiner—Lynne H. Browne
Assistant Examiner—David E. Bochna
(74) Attorney, Agent, or Firm—Sidley Austin Brown & Wood, LLP

(57) ABSTRACT

A drilling device has a carriage (1) on which a drilling member (22) can be removably mounted. In a receiving region, the carriage (1) has a tightening lever (4) that can be swiveled, with its first end area having a tightening surface (5) that interacts with a clamping surface (21) of a connection region of the drilling member (22). The second end area of the tightening lever (4) interacts with a tightening element (9) that keeps the tightening lever (4) under tension of a spring so that the drilling member (22) is firmly pressed against the carriage (1). Using the two release levers (15), the tightening element (9) can be moved into a release position in which the tightening lever (4) can be swiveled into the release position and the tightening element (9) lies against a retention surface (13) on the tightening lever (4). When a drilling member (22) is secured on the carriage (1), the tightening lever (4) is automatically swiveled into a tightened position and locked the tightening element (9).

7 Claims, 5 Drawing Sheets

DRILLING DEVICE

BACKGROUND OF THE INVENTION

The invention refers to a drilling device including at least one guide element, a carriage movable alone the guide element and a drilling member removably mountable on the carriage. The carriage has a receiving region for the drilling member.

In order to drill holes having a large diameter in a hard substrate, drilling devices are used that consist of a guide element, a carriage that can be moved along the guide element and a drilling member that is removably attached to the carriage.

A drilling device disclosed in U.S. Pat. No. 4,614,456 is attached to a carriage by means of a connection region of the drilling device that can be connected in a form-fitting manner to a receiving region of the carriage. A first receiving section of the receiving region forms a tightening lever which, in an end part facing the connection region, has a tightening surface that interacts with the clamping surface of the connection region. A part of the connection region is secured in a form-fitting manner to a second receiving section of the receiving area.

The tightening surface of the tightening lever can be moved against the force of a spring in a direction facing away from the connection region. The tightening element is formed by the piston rod of a compressed air-driven cylinder that can be moved perpendicularly to the direction of movement of the tightening lever. The tightening lever and the piston rod forming the tightening element both have corresponding slanted surfaces with each other. When the piston rod is moved, the tightening lever is moved in a direction facing away from the connection region and the connection region is tightened against the receiving region. In order to prevent the drilling member from becoming detached from the carriage, it must be ensured that the cylinder is supplied with sufficient compressed air for the entire duration of the work on a substrate. A major drawback of this prior art drilling device is its dependence on a source of compressed air. Moreover, this additionally present compressed-air feed line has a negative effect on the overall handling of the drilling device.

SUMMARY OF THE INVENTION

The primary object of the invention is to provide a tightening device including a carriage that can be manufactured economically, to which the drilling member can be affixed quickly, simply and in a self-tightening way, while it can be released from the carriage without additional tools.

On the basis of the embodiment of the drilling device according to the invention, after the drilling member has been secured onto the receiving region of the carriage, a tightening lever pivots into a tightened position in which the drilling member is securely connected to the carriage.

In order to be able to achieve the high tightening force needed in the area of the tightening surface so as to affix the drilling device to the carriage, the tightening lever is preferably configured as a two-arm lever in which the tightening surface is situated on a shorter, first lever arm while the end region of a longer, second lever arm has a tightening surface that faces away from the drilling member and interacts with a tightening element in the tightened position of the tightening lever.

For economic reasons, the tightening element advantageously consists of a part in the form of a pin that extends parallel to a rotational axis of the tightening lever. The pin has, for example, a circular cross section.

A proper and uniform guidance of the tightening element along the tightening surface of the tightening lever is achieved in that the tightening element advantageously runs in two guide grooves on the carriage arranged opposite one another and that extend approximately parallel to the lengthwise extension of the guide column.

The spring-loaded tightening element interacts with two springs that engage the tightening element at a certain distance from each other. To allow a movement of the tightening lever from a tightened position into a release position, the tightening element can advantageously be moved along the guide grooves against the force of the two springs, opposite to the drilling direction, into a release position that releases the tightening lever.

To be able to move the tightening element—which has been pulled into a tightened position—into an open position in which the tightening lever can be swiveled into the release position, it is necessary to exert a force on the tightening element that exceeds the spring force of the two springs. Preferably, this force is exerted by means of a release lever arranged on the carriage so as to swivel.

Advantageously, between the release lever and the tightening element, there is a push rod that has a passage opening at a first free end region through which the tightening element passes. A second end region of the push rod is provided with an elongated hole that extends parallel to the elongated push rod. A guide bolt positioned on the release lever projects into this elongated hole and the guide bolt can transmit to the tightening element a release force exerted on the release lever.

The tightening element of the drilling device according to the invention can be held in a pre-stressed, open position by the tightening lever, which is in a release position. For this purpose, on the face that forms the free end of the second lever arm, the tightening lever advantageously has a retention surface that can be connected to the tightening element. When the drilling member is being secured to the receiving area of the carriage, the tightening lever swivels into a tightened position. In this process, the tightening element slides along the retention surface until it is pulled along the tightening surface by the springs into a tightened position in which the tightening lever is locked.

BRIEF DESCRIPTION OF THE DRAWING

The invention is explained in greater depth with reference to drawings that show an embodiment. The following is shown.

DETAILED DESCRIPTION OF THE INVENTION

Figure 1:
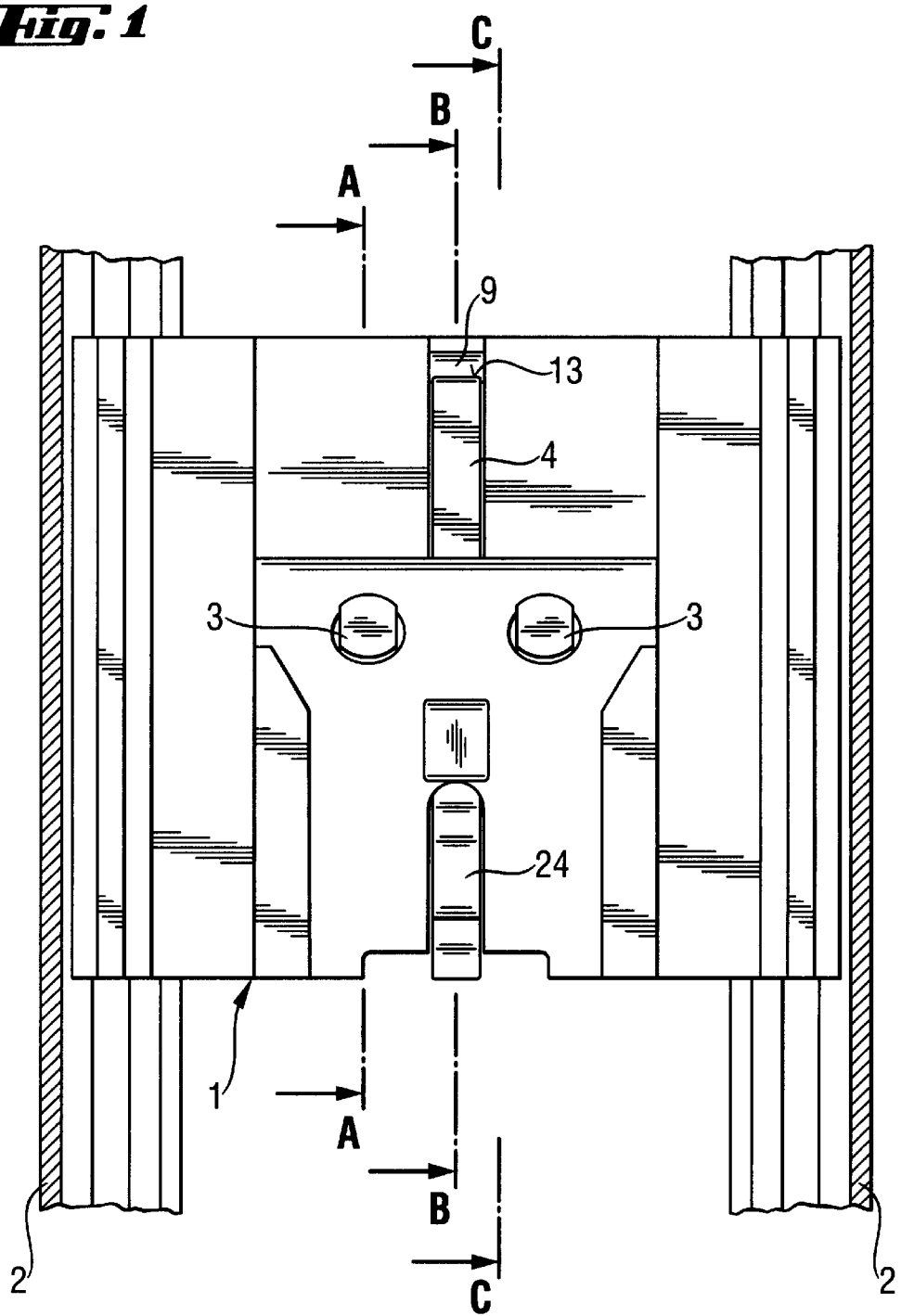
FIG. 1 is a partial side view, partly in section, of a carriage and a part of a guide element of a drilling device according to the invention.

FIG. 1 shows a guide element in the form of two elongated guide columns 2 spaced laterally apart from each other, and connected to a carriage 1 that runs along these guide columns 2 so as to be able to slide axially in the direction of the columns. For example, mechanical drive elements (not shown here) serve for the axial adjustment of the carriage 1. The carriage 1 has a receiving region with two receiving sections 3, 24 spaced apart from one another in the drilling direction. A first receiving section 24 leading in the drilling direction is formed by a tightening lever 4 arranged on the carriage 1 so as to swivel. Two receiving bolts spaced from one another form a second receiving section 3. The term lengthwise direction of the carriage 1 refers to the direction in which the carriage 1 extends from one guide column 2 to the other guide column 2.

As can be seen in FIGS. 2 through 5, the tightening lever 4 can be swiveled around a rotational axis 6. This rotational axis extends perpendicular to the lengthwise axes of the guide columns 2 and parallel to the lengthwise direction of the carriage 1. The tightening lever 4 is formed by a two-arm lever, whereby a shorter, first lever arm forms the first receiving section 24 facing in the drilling direction and it has a tightening surface 5 facing away from the drilling member 22 shown in FIG. 5. This tightening surface 5 is part of a V-shaped recess on the tightening lever 4 that has an open configuration in the drilling direction. The rotational axis 6 is arranged in the vicinity of the tightening surface 5. A longer, second lever arm has a tightening contour 14 at the opposite end of the lever 4 and facing away from the drilling member 22 and can be connected to a pin-like tightening element 9 when the tightening lever 5 is in a tightened position. In an open or release position, a retention surface 13 at an end surface of the tightening lever interacts with the tightening element 9 and is formed by a face that forms part of the second lever arm.

Figure 4:
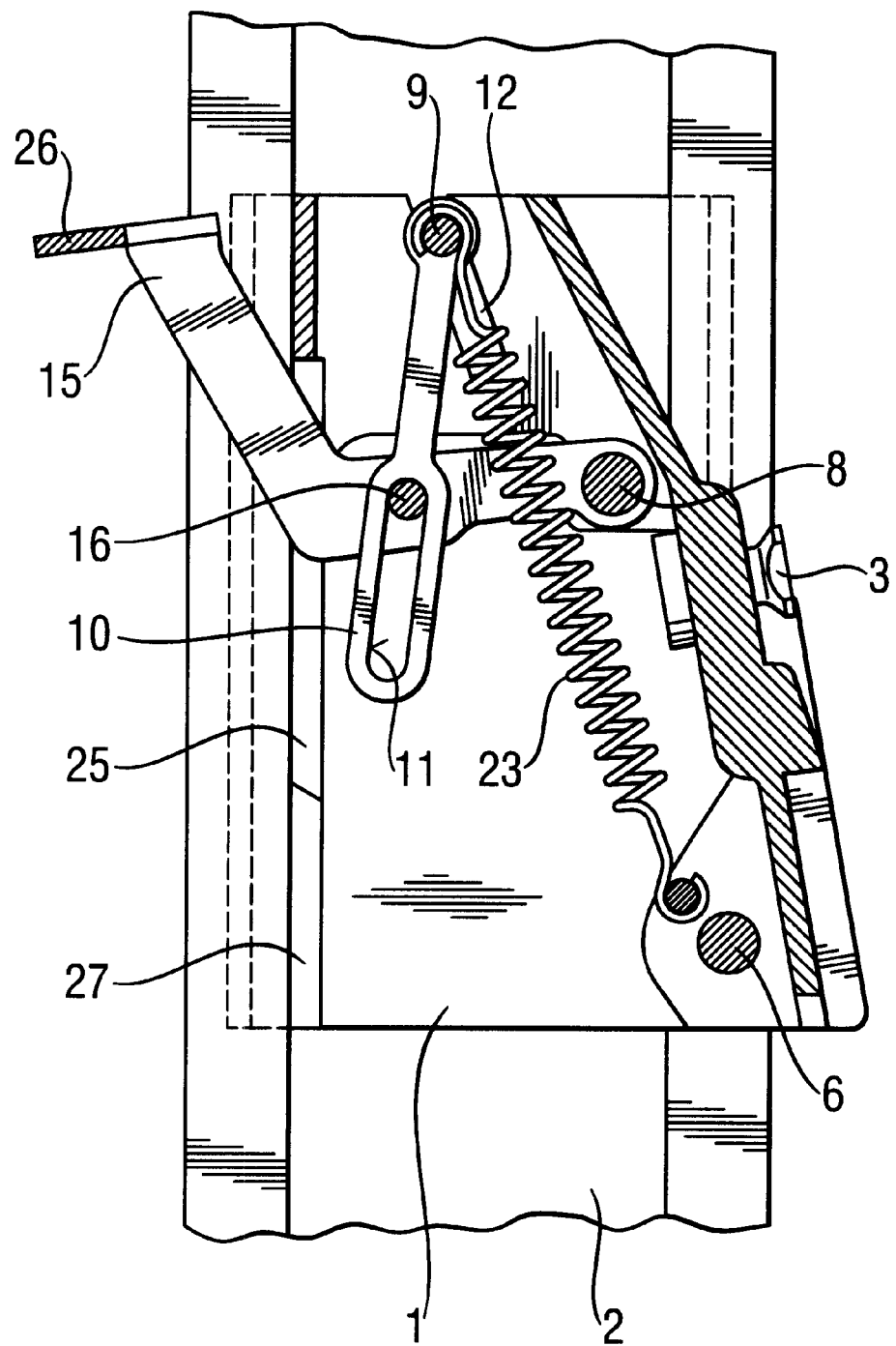
FIG. 4 is a sectional view through the carriage along the line C—C in FIG. 1.

A pin that extends within the carriage 1 parallel to the rotational axis 6 forms the tightening element 9. Each end area of the pin projects into one of two guide grooves 12 arranged opposite from each other whose extension with respect to the lengthwise extension of the guide columns 2 creates an acute angle. The ends of the two guide grooves 12 facing in the drilling direction is closer to the receiving area of the carriage 1 than an opening of the two guide grooves 12 at a free end of the carriage 1 that faces away from the drilling direction. The tightening contour or surface 14 of the tightening lever 4 shown in FIG. 5 and the two guide grooves 12 run at an acute angle W of 5° to 20° with respect to each other when the tightening lever 4 is in a tightened position. As can be seen in FIG. 4, the tightening element 9 interacts with a spring 23 secured at one end in the area of the rotational axis 6 on a likewise pin-like projection of the carriage 1. Using the spring 23, the tightening element 9 is pulled along the guide grooves 12 from an open or release position into a tightened position when the tightening lever 4 is swiveled into its tightened position.

The tightening element 9 is moved along the guide grooves 12 in a direction facing away from the drilling direction by two release levers 15 that are spaced from one another and that can swivel around an axis 8 that runs parallel to the rotational axis 6. Both release levers 15 are connected to each other at their free ends opposite the axis 8 in one piece by a connection web 26. This connection web 26 forms a handle that can be gripped by the user and serves simultaneously to move the two release levers 15 in a swiveling motion.

The tightening element 9 is connected by means of an elongated push rod 10 to release lever 15. At a first end region, the push rod 10 has an opening through which the tightening element 9 passes. A second end area of the push rods 10 is provided with an elongated hole 11 that is arranged parallel to the elongated direction of the push rod 10. A guide bolt 16 arranged on the release levers 15, projects through this elongated hole 11 and the guide bolt 16 can transmit to the tightening element 9 a release force exerted by a user on the release levers 15. The length of the longitudinal hole 11 is dimensioned in such a way that the release levers 15 can even assume their initial position when the tightening element 9 in the open position of the tightening lever 4 lies with pre-stress against the retention surface 13.

A housing of the carriage 1 has two slit-like passage openings 25 that are at a distance from each other and that have an open configuration on the free end of the housing facing in the drilling direction. The two release levers 15 move in the two slit-like passage openings 25 when a user swivels them opposite to the drilling direction into a release position in which the tightening element 9 is in a release position and the tightening lever 4 no longer locks. In an initial position of the release levers 15, the connection web 26 located at the free end of the two release levers 15 is received in a recess 27 of the housing, the recess 27 extending between the two slit-like openings 25. Opposite to the drilling direction, the extension of this recess 27 is shorter than the extension of the slit-like passage openings 25.

The affixing of the drilling member 22 to the carriage 1 and the removal of the drilling device 22 from the carriage 1 is described below.

Figure 2:
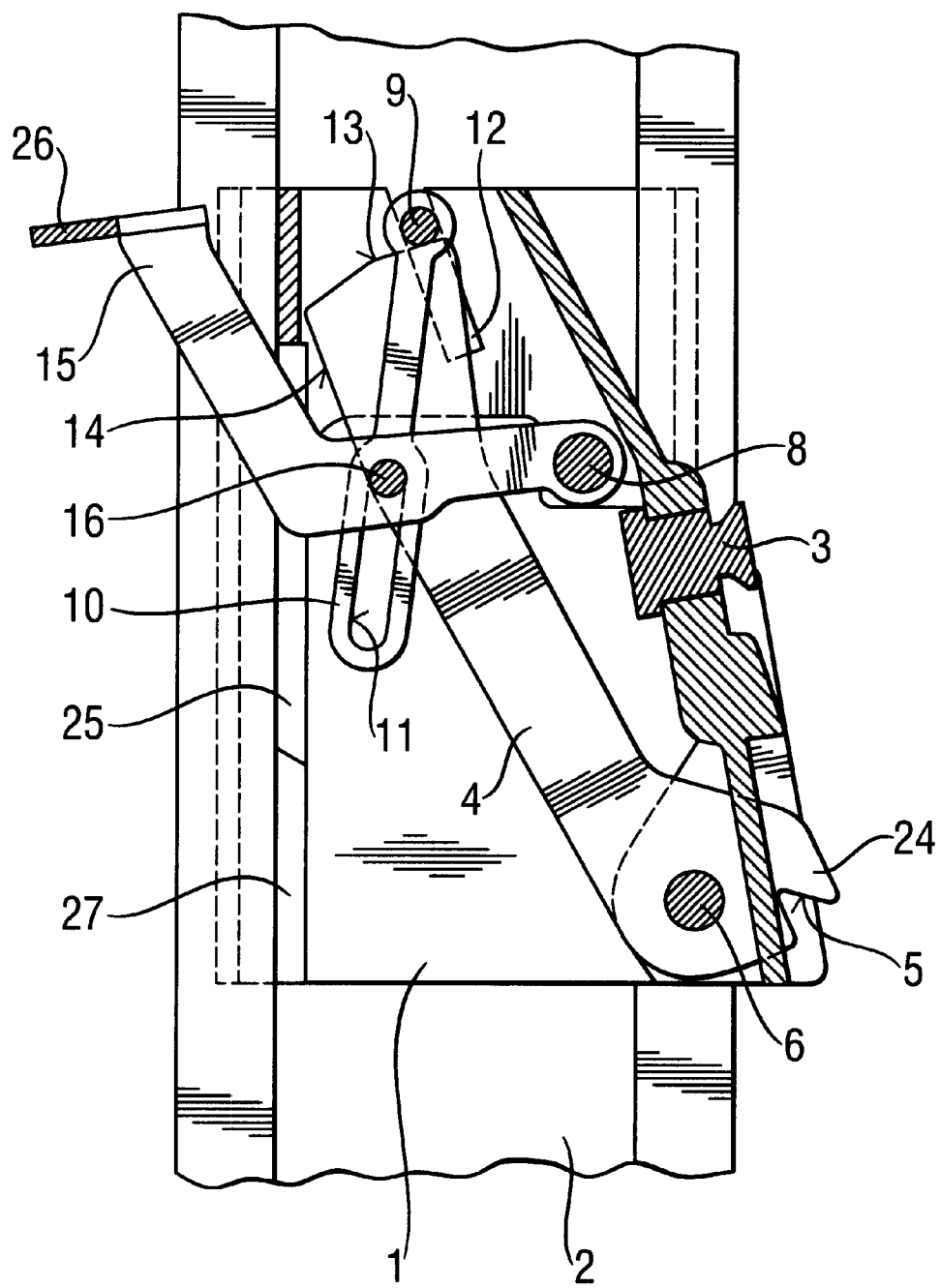
FIG. 2 is a sectional view through the carriage along the line A—A in FIG. 1; with the tightening lever is in an open position.
Figure 3:
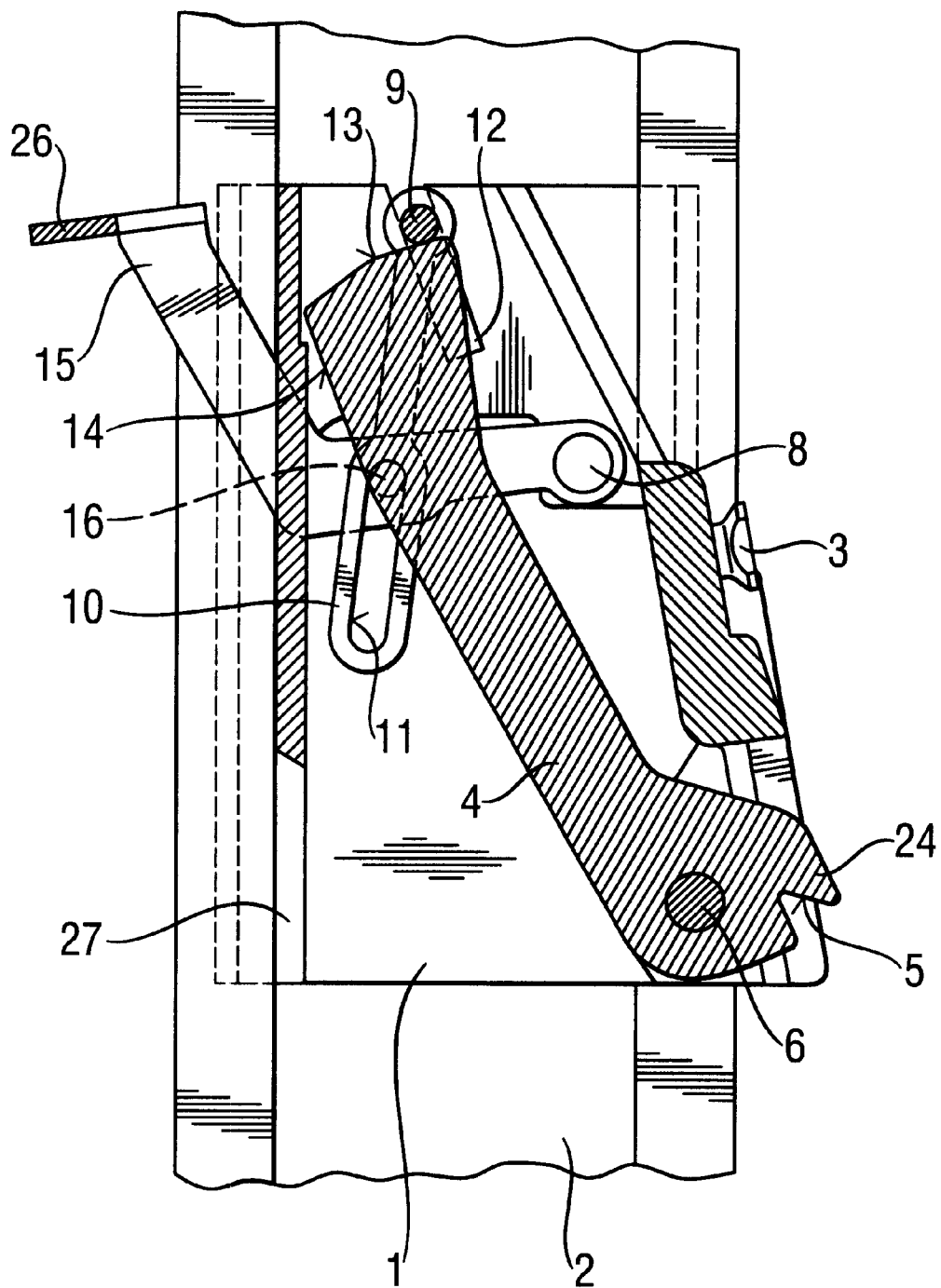
FIG. 3 is a sectional view through the carriage along the line B—B in FIG. 1.

For affixing drilling device 22 to the carriage 1, the tightening lever 4 has to be in a release position, as is shown in FIGS. 2 through 4. In the release position of the tightening lever 4, the tightening element 9 lies against the retention surface 13 of the tightening lever 4, and the V-shaped recess with the tightening surface 5 on the first receiving section 24 of the tightening lever 4 is arranged recessed opposite to the drilling direction.

Figure 5:
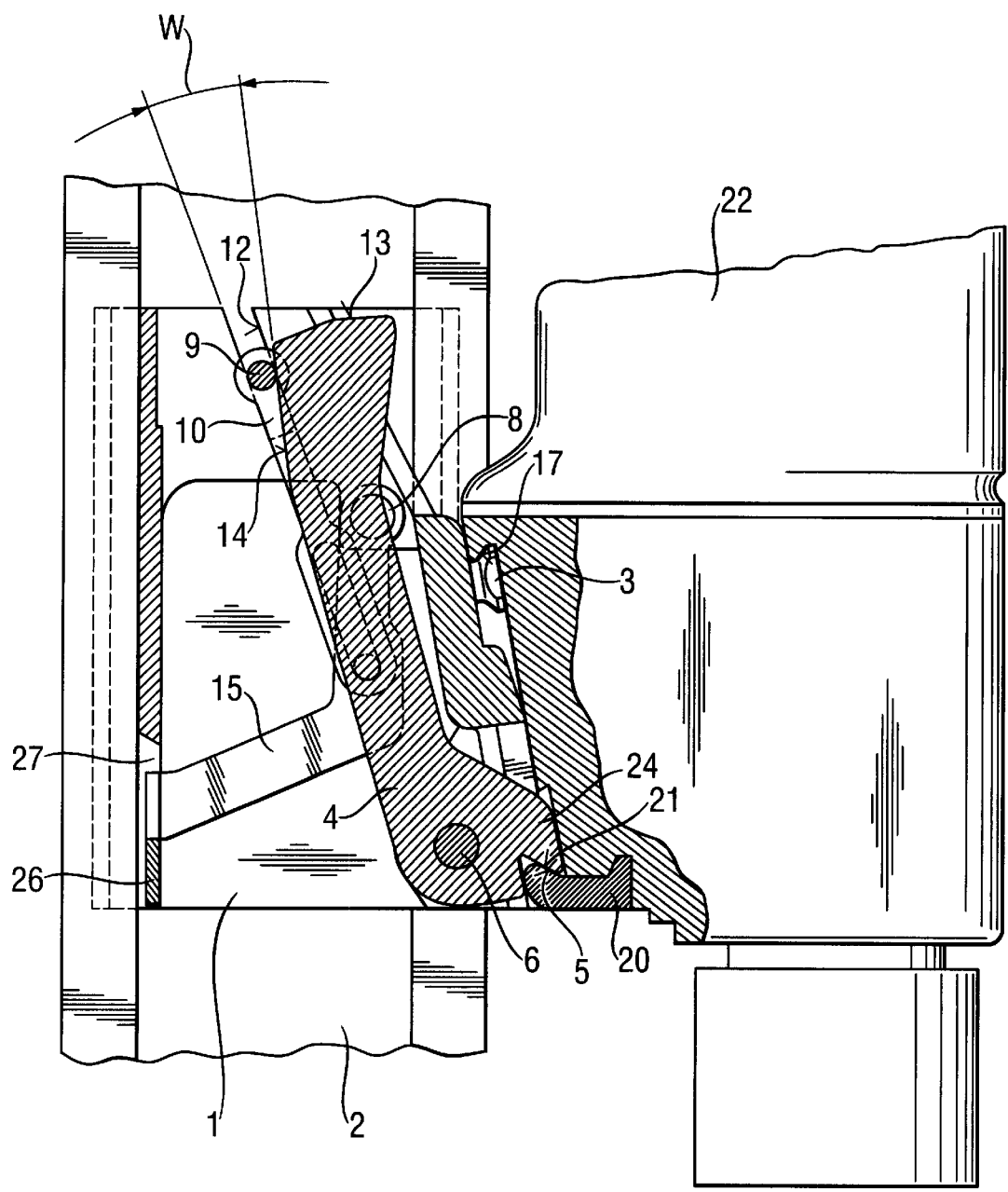
FIG. 5 is a sectional view through the carriage and a part of a drilling member along the line B—B in FIG. 1; with the tightening lever in a tightened position.

When the drilling device 22 is placed onto the carriage 1, note FIG. 5, attention should be paid to ensure that a dovetailed connection region of the drilling device is secured in a form-fitting manner to the second receiving section 3 of the carriage 1. On the free end facing in the drilling direction, the connection region has a clamping plate with a V-shaped projection forming a clamping surface 21, and the V-shaped projection subsequently centers itself in the V-shaped recess of the tightening lever 4 and swivels the tightening lever 4 into a tightened position according to FIG. 5. The tightening element 9 can subsequently be moved by the spring 23 along the tightening surface 14 of the tightening lever 4 into a tightened position. In this process, a tightening force builds up on the tightening surface 5, which is sufficient to affix the drilling device 22 onto the carriage 1 tightly and without play.

In order to be able to remove the drilling device 22 from the carriage 1, the user has to swivel the connection web 26 with the two release levers 15 from an initial, tightened position into a release position. In doing so, the pin-like tightening element 9 is moved in the guide grooves 12 against the force of the spring 23 opposite to the drilling direction from a tightened position into the release position. During the subsequent removal of the drilling member 22 from the carriage 1, the tightening lever 4 is swiveled from a tightened position into a release position in which the tightening element 9, in turn, lies against the retention surface 13 of the tightening lever 4.

What is claimed is:

1. A drilling device comprising at least one elongated guide element (2), a carriage (1) movable along said guide element (2) in the elongated direction thereof and a drilling member (22) removably mountable on said carriage and having a drilling direction extending generally parallel to the elongated direction of said guide element, said carriage (1) has a receiving region for said drilling device with at least two receiving parts (3, 24) spaced apart from one another and arranged to interact in a form-fitting manner with connection parts (17, 20) of a connection region on said drilling device (22), and a tightening surface (5) of said receiving part (24) facing away from said drilling device (22) is movable in an opposite direction relative to a corresponding said connection part (20) and said tightening surface (5) is part of an elongated tightening lever (4) swivelable around a rotational axis (6) and extending transversely of the drilling direction, said tightening lever being displaceable between a tightening position and a releasing position, said tightening lever (4) has two lever arms spaced apart in the elongated direction of said tightening lever (4), a shorter one of said lever arms includes said tightening surface (5) and is located adjacent said rotational axes (6) at one end part of said tightening lever, an opposite end part of said tightening lever (4) has a longer one of said lever arms including a tightening surface (14) extending generally in the elongated direction of said tightening lever (4) and facing away from such drilling devices (22) and acts in contact with a tightening element (9) in the tightening position of said tightening lever (4), said tightening element (9) is located in said carriage (1).

2. A drilling device, as set forth in claim 1, wherein said tightening element (9) comprises a pin extending parallel to said rotational axes (6) of tightening lever (4).

3. A drilling device, as set forth in claim 2, wherein said tightening element (9) moves in two laterally spaced-apart grooves (12) in said carriage (1) which extend angularly relative to the elongated direction of said guide element (2).

4. A drilling device, as set forth in claim 3, wherein said tightening element (9) is movable opposite to the drilling direction along said guide grooves (12) against the force of a spring (23) from the tightening position into the releasing position, said spring (23) is secured to said tightening element (9) at one end and to said tightening lever (4) adjacent said rotational axis (6) thereof.

5. A drilling device, as set forth in claim 4, wherein a release lever (15) swivelably mounted on said carriage (1) is connected to said tightening element (9) for moving said tightening element into the releasing position.

6. A drilling device, as set forth in claim 5, wherein an elongated push rod (10) connects said release lever (15) and said tightening element (9).

7. A drilling device, as set forth in claim 6, wherein said tightening lever has a retention surface (14) located on said second lever arm engageable with said tightening element (9) in the tightening position, said retention surface (14) extends generally in the elongated direction of said tightening lever more remote from said drilling member (22).

* * * * *